United States Patent Office 3,613,148
Patented Oct. 19, 1971

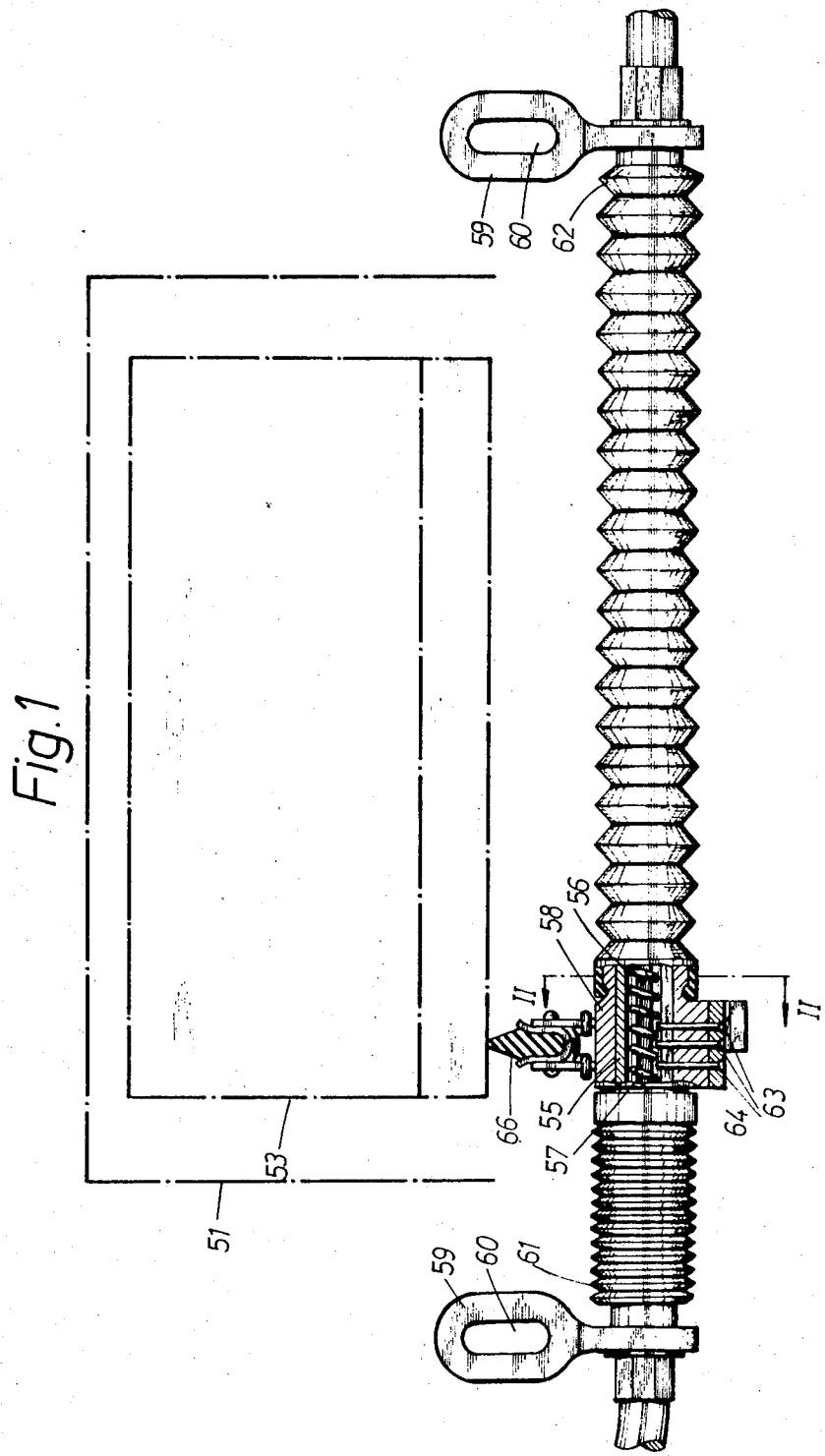

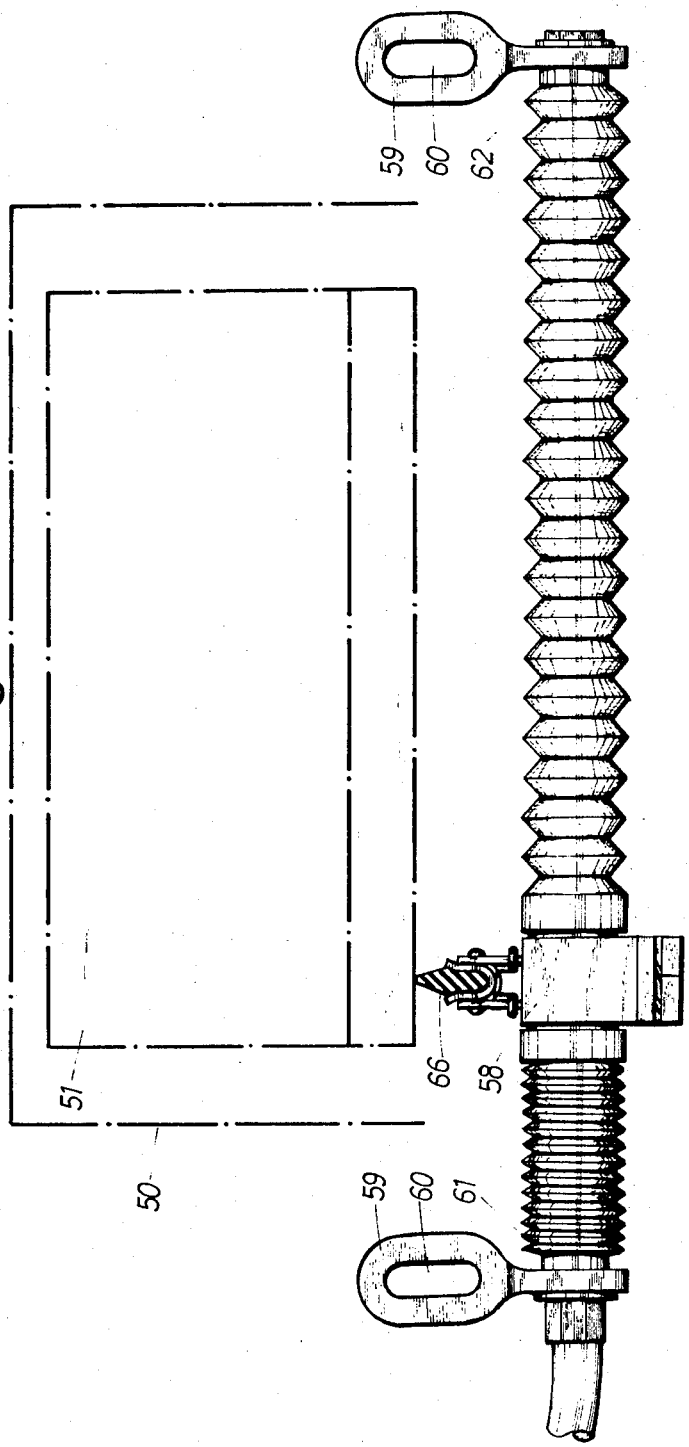

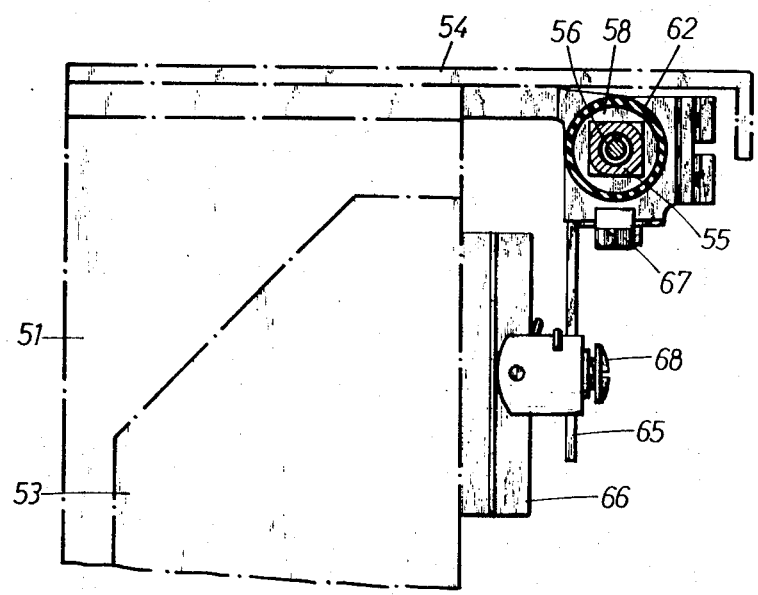

3,613,148
WINDSHIELD WIPER ARRANGEMENT
Willi Meissner and Horst Wieltsch, Heiligenhaus, Germany, assignors to Teleflex Gesellschaft mit beschrankter Haftung, Heiligenhaus, Germany
Filed June 17, 1970, Ser. No. 46,868
Claims priority, application Germany, June 20, 1969, P 19 31 384.9
Int. Cl. B60s 1/44
U.S. Cl. 15—250.29                    10 Claims

ABSTRACT OF THE DISCLOSURE

A wiper assembly, especially for maintaining clean a plurality of sight surfaces forming an angle with each other, which includes a plurality of wiper blades actuated by a single drive, in which the power transfer from a drive to the wiper blades is effected by means of a push rod, and in which for each wiper blade there is provided a carriage coupled to said push rod and movable parallel to the sight surface to be cleaned, said push rod being movable in a guiding pipe serving as guiding means for said carriage while power transfer means operatively interconnect said carriage and said push rod.

---

The present invention relates to a windshield wiper, especially for keeping clean a plurality of panes, which are arranged at an angle with regard to each other, the wiper comprising reciprocable members driven by a single drive while the power transfer from the drive to the wiper is effected by means of a pushrod. More specifically, the invention refers to a windshield wiper of the above mentioned type in which for each wiper member there is required a holding carriage movable parallel to the panes to be cleaned and adapted to be coupled to the pushrod.

Between the pushrod and the holding carriage carrying the wiper blade thus exists a frictional connection. The holding carriage moves parallel to the pushrod in special guiding means which in most instances will have the shape of a housing in order to protect the sliding path of the holding carriage against soiling and other outer influences. Also the pushrod will in most instances be arranged in a guiding pipe which serves not only as protection against soiling but, when employing a flexible pushrod, must also prevent the latter from bending toward the side.

The above mentioned windshield wipers have the drawback that for each holding carriage a separate housing with guiding means has to be provided which requires special parts, additional costs and additional space. Moreover, it is difficult to protect the holding carriage and the guiding pipe for the pushrod in a satisfactory manner against the entry of water and dirt.

It is, therefore, an object of the present invention to provide a windshield wiper arrangement according to which a housing for the holding carriage and the guiding means associated with the housing will be superfluous and in which the provision of protective means against the entry of water and dirt will be possible without difficulties.

This object and other objects and advantages of the invention will appear more clearly from the following specification in connection with the accompanying drawings, in which:

FIGS. 1 and 1a respectively illustrate the overall arrangement of a windshield wiper according to the invention.

FIG. 2 is a section through the guiding pipe with the pushrod and the holding carriage, said section being taken along the line II—II of FIG. 1.

Figure 3:
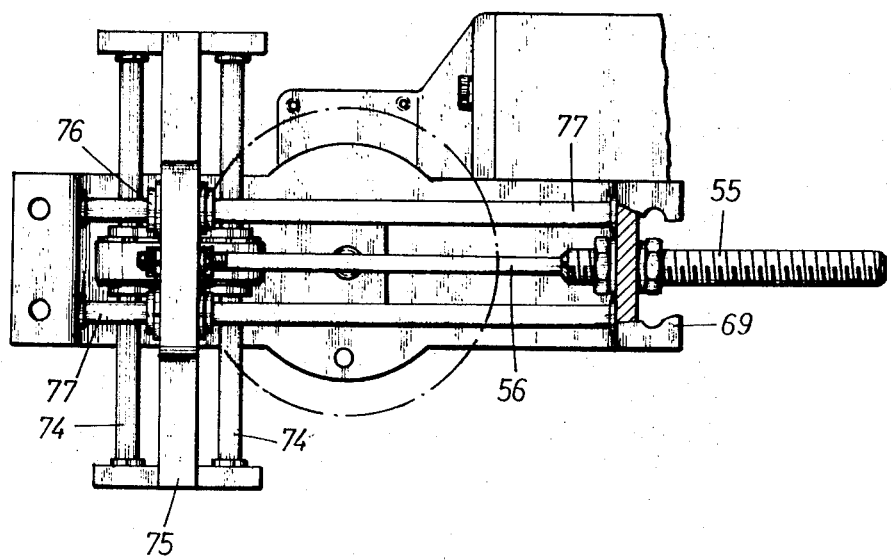
FIGS. 3 and 4 illustrate a drive for the windshield wiper arrangement according to the present invention.

The windshield wiper arrangement according to the present invention is characterized primarily in that the pushrod is movable in a guiding pipe which serves as sliding path for the holding carriage and at least within the region of the movement of the holding carriage has a longitudinal slot through which the power transfer from the pushrod to the holding carriage is effected. This arrangement brings about that the guiding pipe for the pushrod can be taken advantage of in two ways, namely for supporting the holding carriage and moving the same without requiring special guiding means for the holding carriage. The space requirement and the number of structural elements is thus reduced. Furthermore, as will be outlined further below, the arrangement according to the invention makes it very simple to provide protective means for the guiding pipe and the holding carriage. A turning of the holding carriage relative to the guiding pipe is prevented by making the outer profile of the guiding pipe non-round. In this connection a square-shaped outer profile has proved very satisfactory.

According to a further development of the invention, a sleeve is connected to each side of the holding carriage which sleeve surrounds the guiding pipe and is variable as to its length. Inasmuch as with the design according to the invention the holding carriage slides directly on the guiding pipe, a protection for the guiding pipe and for the holding carriage is obtained simultaneously by the provision of such sleeves. It is to be noted that heretofore water and dirt could easily enter at the sides of the holding carriage. Those ends of the sleeves which are not connected to the holding carriage may be connected outside of the region of the pane surface to be cleaned, for instance, at holding means for the guiding pipe.

Inasmuch as a seal by means of the sleeves can now be realized to such an extent that from the outside no air can enter into the interior of the sleeves, it is advantageous, according to a further suggestion of the invention, to interconnect the inner spaces of the two sleeves connected to the holding carriage. In this way it is prevented that the movement of the holding carriage, in one sleeve, has to produce an increase in pressure while, in the other sleeve, it has to produce a decrease in pressure, which fact represents an unnecessary energy consumption. By a connection according to the invention, the difference in volume of the sleeves can be compensated for or equalized in a very simple manner. An advantageous possibility of realizing such connection is obtained when the holding carriage has a rectangular-shaped guiding means for receiving the guiding pipe, when the guiding pipe has a rectangular outer profile in conformity with the guiding means, and when this outer profile at its edges is chamfered by means of which a connection between the inner spaces of the sleeves is established.

The power transfer between the pushrod and the holding carriage is advantageously effected in such a way that the holding carriage at the level of the longitudinal slot in the guiding pipe has bores for follower pins which extend through the longitudinal slot and engage the pushrod. The follower pins can, in case of wear, easily be exchanged. If, however, it is desired to remove the pushrod from the guiding pipe, it is merely necessary to remove the follower pins without any further disassembly. The follower pins may also be designed as threaded pins so that their engagement with the pushrod can be adjusted at any desired time.

The assembly and servicing of a windshield wiper arrangement according to the invention can furthermore be simplified if at the proper areas sufficient adjusting possibilties are provided. This is important particularly when an arrangement is involved according to which a greater number of panes is to be cleaned. To this end, it is advantageous to support the guiding pipe for the pushrod by holding means which, for purposes of an adjustable screw connection, are provided with slots. It is also advantageous to connect the wiper blade with the holding carriage by means of a rectangular arm. Preferably, at one part of the arm which extends parallel to the wiper blade, the wiper blade is connected so as to be displaceable in longitudinal direction, whereas the other part of the arm which is perpendicular to the pane is connected to the holding carriage by means of an oblong hole-screw connection. In this way there exists one possibility to adjust the position of the wiper blade on the pane, whereas according to the other possibility the distance between the pane and the holding carriage and the adjustment of the engaging pressure of the wiper blade can be taken into consideration.

Referring now to the drawings in detail, FIGS. 1 and 1a illustrate two protective boxes or frames 50 and 51 for the optical means or window panes 52 and 53. As will be seen from FIG. 2, the protective boxes, as in this instance the box 51, are covered by a cover plate 54 which at the same time also covers the wiper arrangement within the range of the optical means 53. Arranged in a guiding tube 55 is a pushrod 56 which over its entire length is surrounded by a threaded spindle 57. A guiding carriage 58 has an inner square-shaped cross-section and is adapted to slide on the guiding tube 55 the outer profile of which is adapted to the said square cross-section. The guiding tube 55 is supported by holding means 59 which are arranged adjacent the protective boxes 50 and 51. The holding means 59 have oblong holes 60 so that they can be connected (in a manner not shown) by screws or the like and can be post-set at any desired time. That portion of the guiding tube 55 which moves between two holding means 59 in front of the optical means 52, 53 is surrounded by two sleeves 61 and 62, one end of which each is connected to the holding means 59 while the other end is connected to the holding carriage 58 in such a way that a complete seal against water and dirt is obtained.

As will furthermore be seen from FIG. 2, the square-shaped cross-section of the guiding tube 55 is chamfered at the outer edge so that these chamfered portions form passages which extend in longitudinal direction through the holding carriage 58. If now in one end position of the holding carriage 58, for instance, the sleeve 61 is compressed, the inner space of the sleeve 61 is greatly reduced, whereas the inner space of the sleeve 62 is increased to the same extent. Inasmuch as due to the good seal provided by the sleevs 61 and 62 air can neither escape nor enter, the chamfered portions on the outer profile of the guiding tube 55 form the necessary connecting passage for a volume equalization.

The power transmission between pushrod 56 with its threaded spindle 57 and the holding carriage 58 is effected by follower pins 63 which are located in the holding carriage 58 and extend through a longitudinal slot 64 in the guiding tube 55. The follower pins 63 may be threadedly connected to the holding carriage 58.

Connected to the bottom side of the holding carriage 58 is an arm 65 which carries a wiper blade 66. Arm 65 has a part which extends perpendicularly to the window pane or other optical means 53. This part is easily adjustable at the bottom side of the holding means 59 by means of a screw 67 extending through the oblong hole. At a right angle to the said part there extends a second part of the arm 65 which is parallel to the wiper blade 66 and on which the wiper blade 66 is held by means of a clamping screw 68 in such a manner that its position as to height can easily be adjusted.

Figure 4:
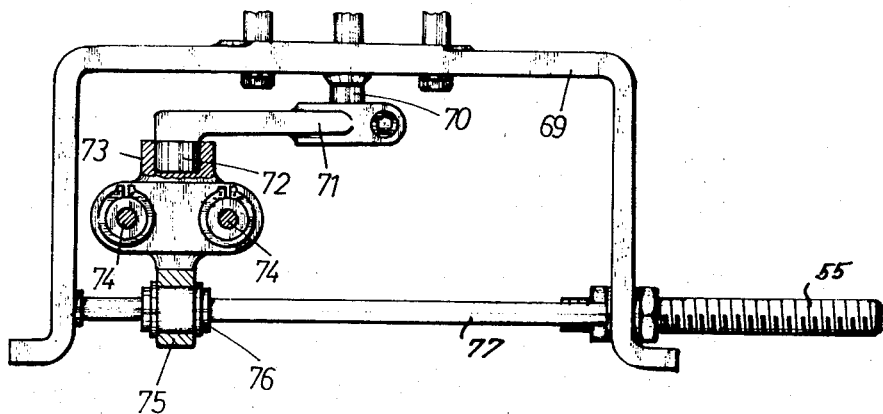

There will now be described an advantageous embodiment for a drive of the wiper arrangement according to the invention, which drive will meet the requirements concerning the stability and rectilinear guiding of the pushrod 56. The end of the guiding tube 55 is connected to a yoke 69 while the end of the pushrod 56 at this area freely protrudes from the guiding tube 55. As will best be seen from FIG. 4, the yoke 69 has also mounted thereon a transmission output shaft 70 the free end of which has connected thereto a lever arm 71. Arm 71 is by means of a pivot 72 journalled in a carriage 73 which thus follows the circular movement of the pivot 72. In the carriage 73 there is journalled a first pair of guiding bars of which the two guiding bars 74 extend perpendicularly with regard to the direction of movement of the pushrod 56. When together with the bearing pivot 72 a circular movement is carried out, the carriage 73 slides on the guiding bars 74 without fully using this directional component which is transverse to the direction of movement of the pushrod. However, the carriage 73 is also by means of the bearing pivot 72 carried along in a direction parallel to the direction of movement of the pushrod. The guiding bars 74 follow this movement which means that they move toward the right with regard to FIG. 3. The ends of the guiding rods 74 are interconnected by a connecting yoke 75. Mounted on the yoke 75 are bearing means 76 which serve for guiding the connecting yoke 75 and the guiding bars 74 on a second pair of guiding bars comprising the guiding bars 77. The guiding bars 77 in their turn are supported by the yoke 69. Furthermore, connected to the bearing means 76 is the free end of the pushrod 56. The movement of the buiding bars 74 and the connecting yoke 75 in the direction of the movement of the pushrod is thus conveyed to the pushrod 56. With such a drive it will be assured that the free end of the pushrod 56. The movement of the guiding bars 74 and acting thereupon which extends in the direction of the longitudinal axis of the pushrod.

It is, of course, to be understood that the present invention is, by no means, limited to the particular showing in the drawings but also comprises any modifications within the scope of the appended claims.

What we claim is:

1. A wiper assembly, especially for cleaning a plurality of sight surface means arranged at an angle with regard to each other, which includes: reciprocable carriage means movable substantially parallel to the sight surface means to be cleaned, wiper blade means supported by said carriage means for wiping the sight surface means to be cleaned, guiding tube means having guiding surface means slidingly engaging said carriage means and forming a guiding path therefor, reciprocable pushrod means reciprocably arranged within said guiding tube means, and means operatively interconnecting said push rod means and said carriage means for reciprocating said carriage means.

2. A wiper assembly according to claim 1, in which said guiding tube means at least within the region of movement of said carriage means has a longitudinal slot, and which includes pin means extending through said slot and operatively interconnecting said carriage means and said push rod means.

3. A wiper assembly according to claim 1, in which the guiding surface means of said tube means have a multi-corner profile.

4. A wiper assembly according to claim 1, which includes bellows means arranged on and connected to opposite ends of said carriage means and surrounding said guiding tube means in an air-tight manner.

5. A wiper assembly according to claim 4, which includes converting means establishing fluid communication between the interior of said bellow means on opposite ends of said carriage means.

6. A wiper assembly according to claim 5 in which said carriage means has an axial passage therethrough of polygonal cross section, and in which said guiding tube means has some outer surface portions in sliding engagement with inner surface portions of said carriage means while other outer surface portions of said guiding tube means together with adjacent inner surface portions of said carriage means define said connecting means, 7. A wiper assembly according to claim 1, in which said guiding tube means at least within the range of its stroke is provided with a longitudinal slot, and in which said carriage means within the region of said slot is provided with pin means in operative engagement with said push rod means.

8. A wiper assembly according to claim 1, which includes holding means associated with said guiding tube means and provided with slot means adapted to receive connecting screw means.

9. A wiper assembly according to claim 1, which includes arm means having two arm sections forming an angle with each other, one of said arm sections being adjustably connected to said carriage means for adjustment in the direction of movement of said carriage means and the other one of said arm sections extending substantially vertically, and holding means supporting said wiper blade means and adjustably connected to said other arm section.

10. A wiper assembly according to claim 1, which includes yoke means having connected thereto one end of said guiding tube means while said push rod means protrudes from said one end of said guiding tube means, driving shaft means journalled in said yoke means, crank lever means rotatably connected to said driving shaft means and including pivot means, a carriage drivingly engaged by said pivot means so as to follow the circular movement thereof, said carriage being connected to said push rod means, a first pair of guiding bars extending substantially perpendicularly with regard to the direction of movement of said push rod means and slidably guiding said carriage while being carried by said carriage, a second pair of guiding bars extending substantially parallel to the direction of movement of said push rod means and slidably guiding said carriage in the direction of reciprocation of said push rod means, said second pair of guiding bars being supported by said yoke means.

References Cited

UNITED STATES PATENTS

| 2,786,225 | 3/1957 | Stites | 15—250.29 X |
| 2,906,129 | 9/1959 | Redd | 15—250.26 X |

FOREIGN PATENTS

| 947,532 | 8/1956 | Germany | 15—250.29 |

PETER FELDMAN, Primary Examiner